United States Patent
Chen et al.

(10) Patent No.: US 8,503,520 B2
(45) Date of Patent: Aug. 6, 2013

(54) METHOD AND APPARATUS FOR ENCODING A FLASH PICTURE OCCURRING IN A VIDEO SEQUENCE, AND FOR DECODING CORRESPONDING DATA FOR A FLASH PICTURE

(75) Inventors: Qu Qing Chen, Beijing (CN); Zhi Bo Chen, Beijing (CN); Xiao Dong Gu, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 982 days.

(21) Appl. No.: 12/310,459

(22) PCT Filed: Sep. 1, 2006

(86) PCT No.: PCT/CN2006/002260
§ 371 (c)(1),
(2), (4) Date: Feb. 25, 2009

(87) PCT Pub. No.: WO2008/028333
PCT Pub. Date: Mar. 13, 2008

(65) Prior Publication Data
US 2009/0245386 A1 Oct. 1, 2009

(51) Int. Cl.
*H04B 1/66* (2006.01)
(52) U.S. Cl.
USPC .......................................................... 375/240
(58) Field of Classification Search
USPC .................................................. 375/240.25
See application file for complete search history.

(56) References Cited

U.S. PATENT DOCUMENTS

| | | | | |
|---|---|---|---|---|
| 5,911,008 A * | 6/1999 | Niikura et al. | ................ | 382/236 |
| 6,580,829 B1 * | 6/2003 | Hurst et al. | ................... | 382/236 |
| 7,016,407 B2 * | 3/2006 | Kaye et al. | ............... | 375/240.01 |
| 7,466,365 B2 * | 12/2008 | Tojo | ............................... | 348/700 |
| 7,880,815 B2 * | 2/2011 | Yeh et al. | ...................... | 348/700 |
| 2006/0083299 A1* | 4/2006 | Kitajima | .................. | 375/240.01 |
| 2006/0203907 A1* | 9/2006 | Yang et al. | ............... | 375/240.03 |
| 2006/0274159 A1* | 12/2006 | Kobayashi | ................. | 348/222.1 |

FOREIGN PATENT DOCUMENTS

| | | |
|---|---|---|
| EP | 0989755 | 3/2000 |
| EP | 1648175 | 4/2006 |
| JP | 2006-121260 | 5/2006 |

OTHER PUBLICATIONS

Search Report Dated May 23, 2007.

* cited by examiner

*Primary Examiner* — Techane Gergiso
(74) *Attorney, Agent, or Firm* — Myers Wolin LLC

(57) ABSTRACT

When video sequences are obtained from e.g. news, interviews, conferences and sports matches, flashlight often appears in the video due to photographing. When encoding the video sequence, the intensity changes a lot so that the motion estimation can not find a well-matching block in a previous picture. Accordingly, the video encoder will encode in intra mode and thereby generate much more bits than for the neighboring non-flash pictures. According to the invention, not the real flash picture is encoded in the video sequence but an artificial non-flash or de-flashed picture, and some indications and parameters are inserted into the bit stream to model the flash effect. The decoder can regenerate the flash picture by reconstructing the non-flash picture and then adding the flash effect. The number of bits required for coding flash pictures is thereby significantly reduced.

4 Claims, 3 Drawing Sheets

Figure 1:
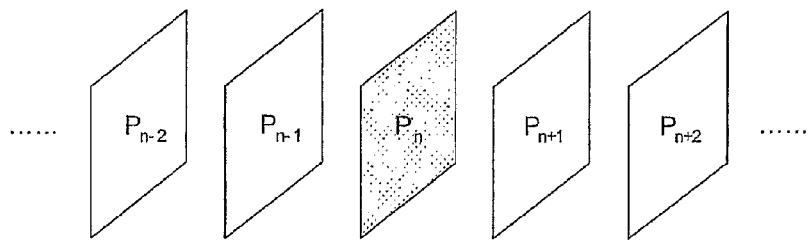

METHOD AND APPARATUS FOR ENCODING A FLASH PICTURE OCCURRING IN A VIDEO SEQUENCE, AND FOR DECODING CORRESPONDING DATA FOR A FLASH PICTURE

This application claims the benefit, under 35 U.S.C. §365 of International Application PCT/CN2006/002260, filed Sep. 1, 2006, which was published in accordance with PCT Article 21(2) on Mar. 13, 2008 in English.

The invention relates to a method and to an apparatus for encoding a flash picture occurring in a video sequence, and for decoding corresponding data for a flash picture.

BACKGROUND

Flash lighting is widely used in taking photographs. When video sequences are obtained from e.g. news, interviews, conferences and sports matches, flash light often appears in the video due to photographing by e.g. journalists. A typical characteristic of a flash picture is that its intensity or brightness increases abruptly so that the flash picture has a much stronger intensity than the previous and the following pictures in the video sequence. Another characteristic of a flash picture is that the intensity change is non-uniformly distributed within the entire picture. That is, some parts of the picture may have a greater intensity increase than other parts. Moreover, due to the different distances from the flashlight or due to shelter and the shadow, it is hard to find an accurate model for estimating the change of the intensity within the picture.

For the above two reasons, some unusual phenomena will be noticed when the video is encoded by existing video coding technologies, such as MPEG-2, H.263, MPEG-4 AVC/H.264 and VC-1, are based on a hybrid video coding processing and use motion estimation to reduce the temporal redundancy. The motion estimation is block-based and tries to find the best-matching block by determining the minimum sum of the absolute difference (SAD) values of the residues. However, when flash happens for example in picture $P_n$ in FIG. 1, the intensity changes a lot so that the motion estimation can not find a well-matching block in a previous picture $P_{n-1}$ or $P_{n-2}$. Accordingly, the video encoder usually tends to encode picture $P_n$ in intra mode, since in this case the intra coding can achieve a little better rate-distortion performance than coding in inter mode. Nevertheless, no matter in which mode the blocks or macroblocks of this picture are coded, a great amount of bits will be produced so that the whole flash picture $P_n$ will usually generate much more bits than the neighbouring non-flash pictures $P_{n-1}$ and $P_{n+1}$, and this will cause a significant bit rate fluctuation for transmission.

If only one reference frame is used, the encoding of the non-flash picture $P_{n+1}$ which is following the flash picture $P_n$ will again meet the same problem in that the motion estimation for the non-flash picture $P_{n+1}$ can not find the matched block in the flash picture $P_n$ since there is a big intensity difference between the two pictures. Consequently, again a lot of bits are generated for the non-flash picture $P_{n+1}$ Fortunately, the multiple reference frames processing feature in H.264/AVC solves this problem. The blocks or macroblocks of non-flash picture $P_{n+1}$ can be predicted from the other non-flash picture $P_{n-1}$ and hence the encoding of picture $P_{n+1}$ will not produce a large amount of bits. However, the multiple reference frames still can not prevent the encoding of the flash picture $P_n$ from producing too many bits.

For H.264/AVC Main and extended profiles, another approach denoted 'weighted prediction' has been proposed by J. M. Boyce, "Weighted prediction in the H.264/MPEG AVC video coding standard", IEEE 2004, ISCAS 2004, in order to deal with the problem of coding fade-in, fade-out, and at the same time it tries to reduce the bit rate of coding a flash picture to some extent. There are two weighted prediction modes: explicit mode, which is supported in P, SP, and B slices, and implicit mode, which is supported in B slices only. In the explicit mode, weighting factors (including multiplicative weighting factors and the additive offsets) are transmitted in the bit stream, while in the implicit mode the weighting factors are instead derived based on relative distances between the current picture and the reference pictures.

INVENTION

For fade-in and fade-out, a single weighting factor and offset are sufficient to efficiently encode all the macroblocks in a picture, because the intensity change is uniformly applied across the entire picture. But for camera flashes, the intensity change is non-uniform within the entire picture, therefore different macroblocks in the same picture require different weighting factors. However, even in this way still a lot of bits are to be used for encoding the flash picture. Typically, the number of bits wasted when encoding a flash picture is three or more times higher than that for normal non-flash pictures under the same quantisation parameters. Therefore, although the weighted prediction improves the coding efficiency especially in intensity or brightness fading sequences, it can not significantly or even perfectly reduce the bit rate burst caused by encoding a flash picture in the video sequence.

A problem to be solved by the invention is to reduce significantly the additional bit rate required for coding flash pictures. This problem is solved by the methods disclosed in this document. Apparatuses that utilise these methods are disclosed in this document.

The invention requires significantly fewer bits for coding a flash picture whereby the subjective picture coding/decoding quality is kept on a high level. The invention is based on the human visual system HVS when encoding flash pictures. A flash picture is usually too transient so that the human eye does not note any details of the picture but only the impression of flashing. Meanwhile the HVS will complement the details of the flash picture in the viewing memory with that of previous and following pictures.

Based on this fact, not the real flash picture is encoded in the video sequence but an artificial non-flash or de-flashed picture, and some simple indications and parameters are inserted into the bit stream to model the flash effect, i.e. an artificial picture is encoded instead of the real picture. Accordingly, the decoder can regenerate the flash picture by reconstructing the non-flash picture and then adding the flash effect. In some embodiments, even the transmission of the artificial non-flash picture can be omitted, or it can be partially coded, and the decoder can regenerate the artificial non-flash picture by temporal interpolation using the previous picture and the subsequent picture.

Advantageously, the number of bits used for coding flash pictures in a video sequence is significantly reduced and the bit rate burst occurring in known coding methods can be avoided.

The subjective impression of 'flash picture' is kept due to the good exploration on the HVS. Although the decoded flash picture itself will be a bit different from the original flash picture, people will not notice this because they are watching the video sequence and not the single pictures.

In principle, the inventive method is suited for encoding a flash picture occurring in a video sequence, wherein the encoded flash picture data belong to a data stream representing the encoded video sequence, said method including the steps:
  determining whether or not a current picture is a flash picture;
  if not true, encoding said current picture in a normal way;
  if true, not encoding said current picture in the normal way but instead generating flash picture indication data and flash picture parameters data for insertion into said data stream, which flash picture indication data and flash picture parameters data are to be used in decoding said data stream for generating from an artificial non-flash picture a flash effect picture for said flash picture,
or includes the steps:
  if true, not encoding said current picture in the normal way but instead generating flash picture indication data and flash picture parameters data for insertion into said data stream and generating an artificial non-flash picture for said flash picture and encoding it or encoding parts thereof, which flash picture indication data and flash picture parameters data are to be used in decoding said data stream for generating a flash effect picture for said flash picture.

In principle the inventive method is suited for decoding data for a flash picture that had occurred in a video sequence, wherein the encoded flash picture data belong to a data stream representing the encoded video sequence, and wherein said data for said flash picture were encoded by the steps:
  determining whether or not a current picture was a flash picture;
  if not true, said current picture was encoded in a normal way;
  if true, said current picture was not encoded in the normal way but instead flash picture indication data and flash picture parameters data were generated for insertion into said data stream,
said decoding method including the steps:
  parsing the received data stream for getting said flash picture indication data and said flash picture parameters data;
  temporally interpolating from normal-way decoded pictures adjacent to said flash picture an artificial non-flash picture and generating therefrom a flash effect picture for said flash picture using said indication data and flash picture parameters data,
or:
  if true, said current picture was not encoded in the normal way but instead flash picture indication data and flash picture parameters data were generated for insertion into said data stream and an artificial non-flash picture for said flash picture was generated and was encoded or parts thereof were encoded,
said decoding method including the steps:
  parsing the received data stream for getting said flash picture indication data and said flash picture parameters data;
  decoding or partially decoding said encoded artificial non-flash picture;
  generating therefrom a flash effect picture for said flash picture using said indication data and flash picture parameters data.

Advantageous additional embodiments of the invention are disclosed in the respective dependent claims.

DRAWINGS

Figure 2:
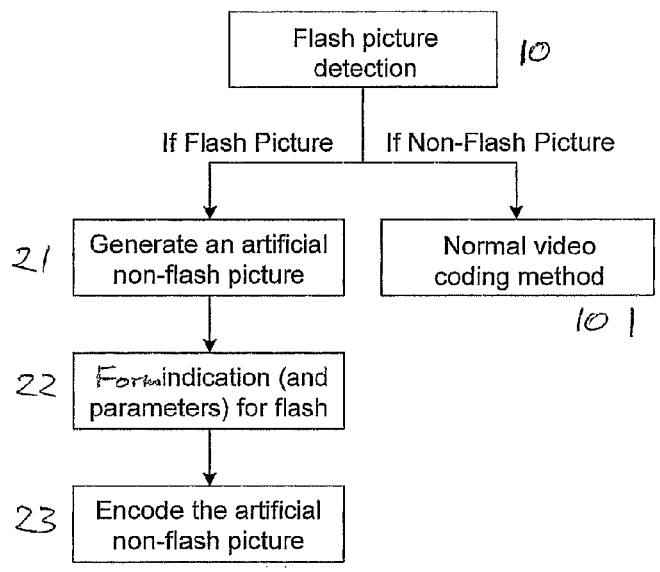
Figure 3:
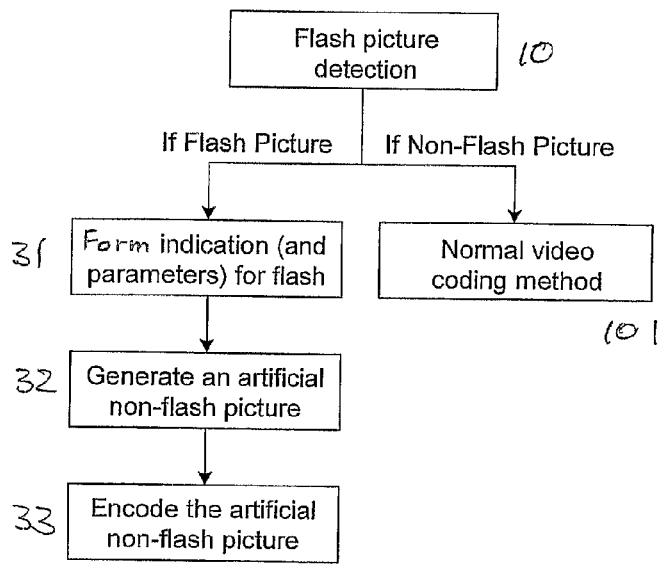
Figure 4:
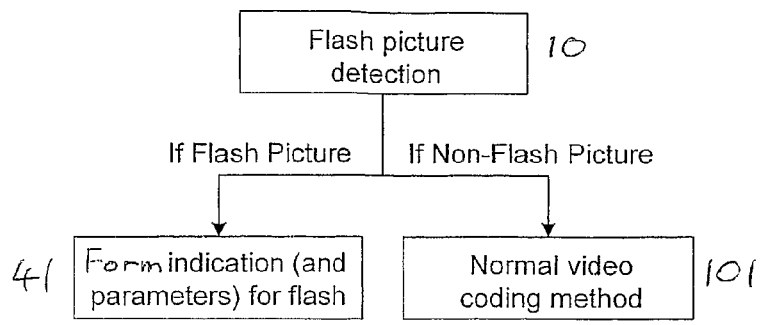
Figure 5:
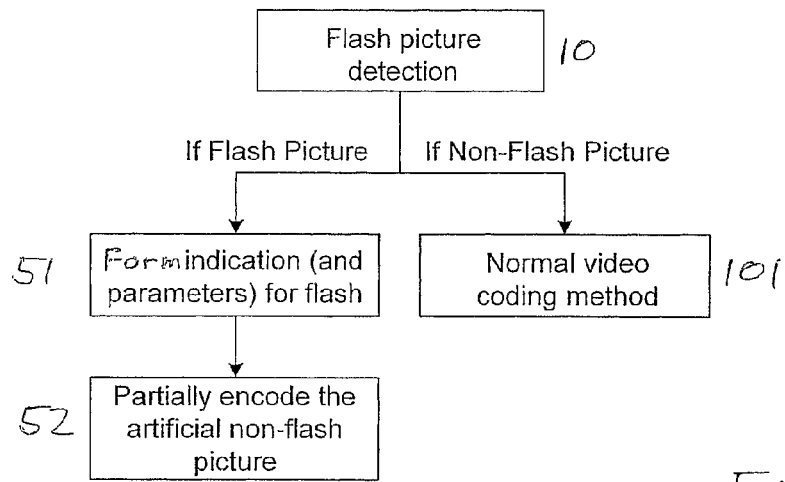
Figure 6:
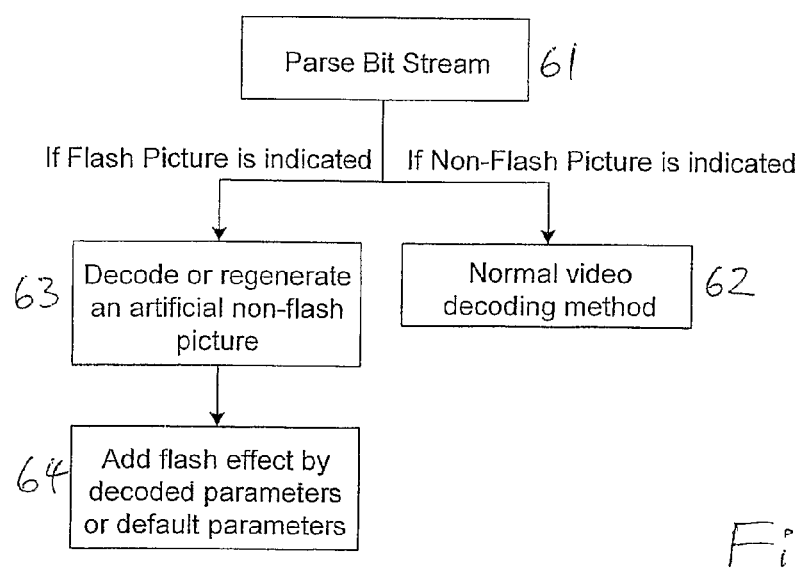
Figure 7:
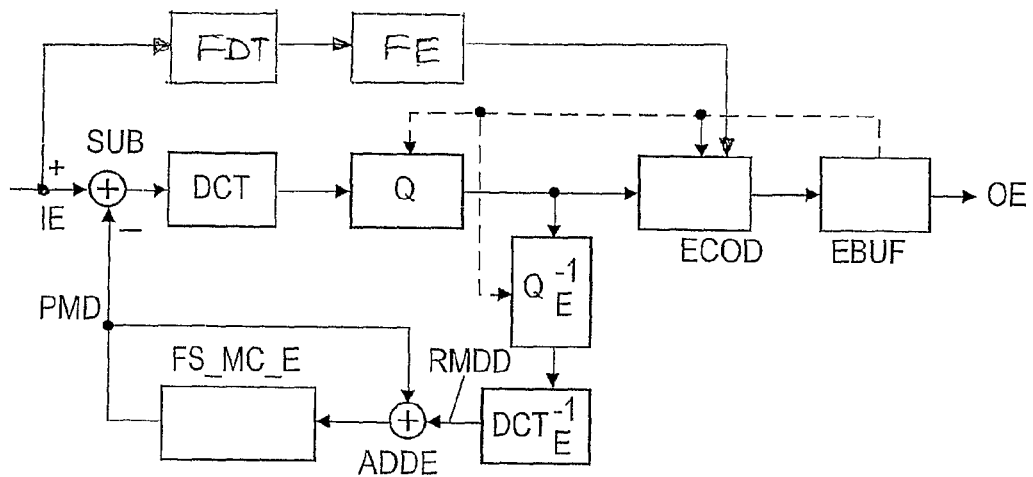
Figure 8:
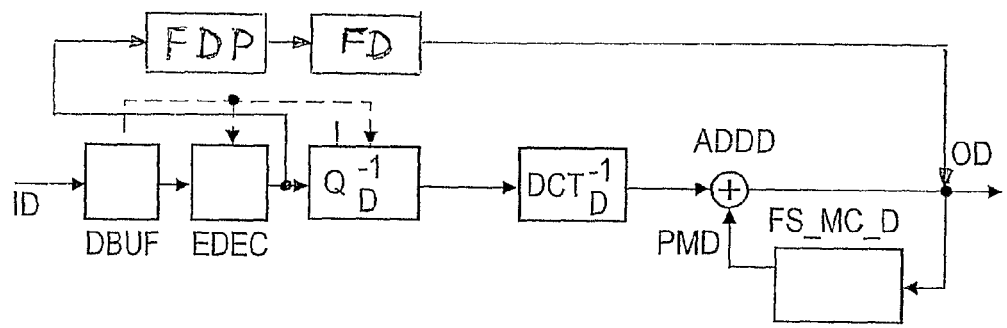

Exemplary embodiments of the invention are described with reference to the accompanying drawings, which show in:

FIG. 1 a flash picture in a video sequence;
FIG. 2 first embodiment of flash picture encoding;
FIG. 3 second embodiment of flash picture encoding;
FIG. 4 third embodiment of flash picture encoding;
FIG. 5 fourth embodiment of flash picture encoding;
FIG. 6 flowchart for flash picture decoding;
FIG. 7 block diagram of the inventive encoder;
FIG. 8 block diagram of the inventive decoder.

EXEMPLARY EMBODIMENTS

In all embodiments, the inventive processing begins with a pre-analysis flash picture detection step or stage 10. A flash picture can be detected easily by calculating its average intensity or its intensity histogram and comparing it with the corresponding values of neighbouring pictures, e.g. as proposed in D. Zhang, W. Qi, H. J. Zhang, "A new shot boundary detection algorithm", Lecture Notes in Computer Science, 2195:63, 2001. If the current picture is not a flash picture, a known video encoding processing 101 is carried out. If the current picture is determined as being a flash picture, in most of the embodiments an artificial non-flash (or de-flashed) picture is generated, a flash indication and modelling takes place, and an artificial non-flash (or de-flashed) picture is encoded.

In case a flash picture is detected, the following process is employed in the first embodiment shown in FIG. 2. In a first step or stage 21, an artificial non-flash picture is generated. Such artificial non-flash picture can be generated in various ways, e.g. by using picture interpolation to construct the artificial non-flash picture $P_n$ from the previous non-flash picture $P_{n-1}$ and the subsequent non-flash picture $P_{n+1}$.

There are a lot of picture interpolation algorithms, such as the optical flow based interpolation algorithm in J. Ribas-Corbera, J. Sklansky, "Interpolation of cinematic sequences", IEEE Workshop on Applications of Computer Vision, Proceedings, 1992, and motion or true motion based interpolation methods like described in G. Dane, T. Q. Nguyen, "Optimal temporal interpolation filter for motion-compensated frame rate up conversion", IEEE Transactions on Image Processing, Vol. 15, No. 4, April 2006, an in S. Sekiguchi, Y. Idehara, K. Sugimoto, K. Asai, "A low-cost video frame-rate up conversion using compressed-domain information", IEEE International Conference on Image Processing, 2005.

These known techniques have been employed in frame rate up-conversion and in error concealment. Known picture interpolation methods might have some limitations in some cases, e.g. in the presence of high motion, but when these methods are used in this invention their performance can be much better because the information for the current picture can be obtained from the original flash picture. Therefore, when some parts of the current picture can not be interpolated very well from the former and the following pictures, they can be constructed more accurately from the original flash picture.

Another method for artificial non-flash picture generation is using a de-flicker technology, which was originally used to reduce flicker artifacts in old movies caused by physical degradations of the film. In J. Delon, "Movie and video scale-time equalisation application to flicker reduction", IEEE Transactions on Image Processing, Vol. 15, No. 1, January 2006, several approaches to remove flicker are described and compared, such as an affine degradation model and histogram matching, for a scale-time equalisation.

To summarise, an artificial non-flash picture is generated by using one of the above-cited methods or by similar processings.

In a second step or stage 22, because there is no real encoding of the flash picture, an indication (e.g. a specific code word) and parameters (for the reconstruction of a flash effect picture, e.g. intensity centre coordinates, intensity distribution function, some coefficients of a function to simulate the change of intensity and colour) for the current flash picture are formed, i.e. the flash effect is model based. According to the HVS property, the human visual system will not catch the details between the real flash picture and the model generated flash picture when watching the video sequence. Further details of flash modelling and parameterisation are not the focus of this invention.

In a third step or stage 23, an artificial non-flash picture according to these parameters is encoded (i.e. the parameters itself are also encoded) and the corresponding code is inserted into the video sequence bit stream. The artificial non-flash picture can be encoded using the normal video coding methods. Much fewer bits are needed because most of the intensity changes due to the flashlight are removed. So there will not be a bit rate burst in the flash picture. The subsequent non-flash picture $P_{n+1}$ can be predicted from this artificial non-flash picture $Pa_n$ or from the former non-flash picture $P_{n-1}$.

In a second embodiment shown in FIG. 3, the step/stage 31 of forming the indication and the parameters is carried out before the step/stage 32 of generating an artificial non-flash picture, which is followed by the step/stage 33 of encoding and inserting the corresponding code into the video sequence bit stream.

There is another way to encode the artificial non-flash picture. That is, it is not coded as shown in FIG. 4 or it is partially coded as shown in FIG. 5 because it can be interpolated in the decoder from the previous picture and the subsequent picture.

In more detail, in a third embodiment depicted in FIG. 4, merely the step/stage 41 of forming the indication and the parameters and inserting the corresponding code into the video sequence bit stream is present, and the artificial non-flash picture is not coded.

Sometimes the interpolation can not reconstruct the artificial non-flash picture very well because there is some object in the picture with big or complex motion in it. And hence, in a fourth embodiment depicted in FIG. 5, the artificial non-flash picture needs to be partially coded in a step/stage 52, following the step/stage 51 of forming the indication and the parameters. That is, the encoder performs an interpolation first and determines which parts of the picture can not be interpolated well. Then the encoder codes these parts (including the location and the detail information) using the original flash picture. Similarly, in this condition the later non-flash picture can not predict from this artificial picture and therefore uses the more previous pictures as reference.

Anyway, the above embodiments based on an artificial non-flash picture will not produce as many bits as the coding of the original flash picture.

The decoder in FIG. 6 has a step or stage 61 that parses the code for the pictures of the received bit stream. If a non-flash picture is indicated, a known video decoding is performed in step or stage 61. If a flash picture is indicated, in step/stage 63 the current artificial non-flash picture is decoded or, if the parameters are omitted in the bit stream, the decoder, upon receiving the indication, regenerates an artificial non-flash picture. In a following step/stage 64 the decoder adds the flash effect to the artificial non-flash picture by using the received and decoded parameters or, if the parameters are omitted in the bit stream, adds the flash effect to the artificial non-flash picture by using stored default parameters.

In the third embodiment, the decoder reconstructs the missing picture $Pa_n$ by interpolating it from the previous decoded non-flash picture $P_{n-1}$ and the subsequent decoded non-flash picture $P_{n+1}$. It is to be noted is that in this case the subsequent non-flash picture $P_{n+1}$ can not be predicted from the artificial picture $Pa_n$ and therefore will use the pictures before the artificial picture, e.g. $P_{n-1}$, as reference.

In case the flash occurs in two consecutive pictures, the inventive processing still works because this kind of flash can still be detected by the above-mentioned method of D. Zhang, W. Qi, H. J. Zhang, "A new shot boundary detection algorithm", and the two artificial non-flash pictures can still be generated according to the invention.

In FIG. 7 the encoder video data input signal IE includes macroblock data to be encoded. In case of intraframe data without prediction a subtractor SUB simply passes the data via transform means DCT, e.g. discrete cosine transform means, and quantising means Q to entropy encoding means ECOD which may perform variable length encoding or arithmetic coding, and which deliver via encoder buffer EBUF the encoder video data output signal OE. In case of inter predicted data or intra predicted data, subtractor SUB subtracts predicted macroblock data PMD from the input signal and passes the difference data via transform means DCT and quantising means Q to entropy encoding means ECOD. The output signal of Q is also fed to inverse quantising means $Q_E^{-1}$, the output signal of which passes through correspondingly inverse transform means $DCT_E^{-1}$ to adder ADDE in the form of reconstructed macroblock or sub-macroblock difference data RMDD. The output signal of ADDE is intermediately stored in frame store and motion estimation and compensation means FS_MC_E which include a prediction error calculator and which also perform motion compensation on reconstructed macroblock data or reconstructed sub-macroblock data (4*4 luma block data) and which deliver predicted macroblock data or predicted 4*4 luma block data PMD to subtractor SUB and to the other input of adder ADDE. In case of inter prediction the data intermediately stored are data related to a different (e.g. the previous) picture whereas in case of intra prediction the data intermediately stored are previously processed data related to the current input picture. Quantiser Q, inverse quantiser $Q_E^{-1}$, and entropy encoder ECOD are controlled basically by the filling level of an output buffer BUF. In step or stage FDT it is determined whether the current input picture (or two adjacent input pictures) is a flash picture. In step or stage FE steps 21 to 23 in FIG. 2, or steps 31 to 33 in FIG. 3, or steps 41 in FIG. 4, or steps 51 and 52 in FIG. 5 are performed. The resulting data are either fed to entropy encoding means ECOD or to encoder buffer EBUF so that they are transmitted in the corresponding fashion in the encoder video data output signal OE.

In FIG. 8 the decoder video data input signal ID passes through decoder buffer DBUF and entropy decoding or arithmetic decoding means EDEC, inverse quantising means $Q_D^{-1}$, and inverse transform computing means $DCT_D^{-1}$, e.g. inverse discrete cosine transform means, to an adder ADDD which delivers the decoder video data output signal OD. The output signal of ADDD is fed to frame store and motion compensation means FS_MC_D which also perform motion compensation on reconstructed macroblock data or reconstructed sub-macroblock data (4*4 luma block data) and which deliver predicted macroblock data or predicted 4*4 luma block data PMD to the other input of adder ADDE. In case of intraframe macroblock data without prediction the adder ADDD simply passes the output signal of $DCT_D^{-1}$. In case of inter predicted data the data intermediately stored are data related to a different (e.g. the previous) picture whereas in case of intra predicted data the data intermediately stored are previously processed data related to the current input picture. Inverse quantiser $Q_D^{-1}$ and entropy decoder EDEC are controlled according to the kind of control for $Q_E^{-1}$ and ECOD. Normally, in motion compensation means FS_MC_D the same motion vector information is used as in motion compensation means FS_MC_E. The transmitted flash picture related data are regained from the received data stream ID in a flash data parser step or stage FDP. in a following flash data decoder FD steps 63 and 64 of FIG. 6 are carried out. The reconstructed flash picture data are part of video data output signal OD.

The invention is very suitable for the application of video broadcasting or mobile related rate constrained video applications, but can also be used in connection with pre-recorded media like DVD, HD-DVD and Blu-ray.

Besides the compression of pictures with flash, the bit stream syntax proposed in this invention can also be used for flash scene retrieval or video highlight detection, because in most of the cases the flash appears in the highlight scene in video sequences.

The invention claimed is:

1. A method for encoding a video sequence comprising a flash picture occurring in said video sequence, wherein the encoded picture data belong to a data stream representing the encoded video sequence, said method further comprising:
   determining whether or not a current picture is a flash picture;
   if not true, encoding said current picture in a normal way, wherein the normal way is a standard video encoding;
   if true, either:
   generating flash picture indication data and flash picture parameters data for insertion into said data stream, and not encoding the flash picture and not inserting the flash picture into said data stream, wherein the generated flash picture indication data and flash picture parameters data are used in decoding said data stream for generating from a previously decoded non-flash picture available in said decoding a flash effect picture for said flash picture; or
   generating flash picture indication data for insertion into said data stream, and not encoding the flash picture and not inserting the flash picture into said data stream, wherein the generated flash picture indication data and default flash picture parameters data stored at decoder side are used in decoding said data stream for generating said flash effect picture.

2. An apparatus for encoding a video sequence comprising a flash picture occurring in said video sequence, wherein the encoded picture data belong to a data stream representing the encoded video sequence, said apparatus comprising a memory device and a processor device configured to:
   determine whether or not a current picture is a flash picture;
   if not true, encode said current picture in a normal way wherein the normal way is a standard video encoding;
   if true, either:
   generate flash picture indication data and flash picture parameters data for insertion into said data stream, and not encode the flash picture and not insert the flash picture into said data stream, wherein the generated flash picture indication data and flash picture parameters data are used in decoding said data stream for generating from a previously decoded non-flash picture available in said decoding a flash effect picture for said flash picture; or
   generate flash picture indication data for insertion into said data stream, and not encode the flash picture and not insert the flash picture into said data stream, wherein the generated flash picture indication data and default flash picture parameters data stored at decoder side are used in decoding said data stream for generating said flash effect picture.

3. A method for decoding data for a flash picture that had occurred in a video sequence, wherein the encoded flash picture data belong to a data stream representing the encoded video sequence, and wherein said data for said flash picture are encoded by:
   determining whether or not a current picture is a flash picture;
   if not true, said current picture is encoded in a normal way wherein the normal way is a standard video decoding;
   if true, either:
   flash picture indication data and flash picture parameters data are generated for insertion into said data stream, and said flash picture is not encoded and not inserted into said data stream,
   said decoding method comprising:
   parsing the received data stream for getting said flash picture indication data and said flash picture parameters data;
   temporally interpolating from at least one normal-way decoded pictures adjacent to said flash picture a non-flash picture and generating therefrom, using said indication data and flash picture parameters data, a flash effect picture for said flash picture; or
   flash picture indication data are generated for insertion into said data stream, and said flash picture is not encoded and not inserted into said data stream,
   said decoding method comprising:
   parsing the received data stream for getting said flash picture indication data;
   temporally interpolating from at least one standard decoded pictures adjacent to said flash picture a non-flash picture and generating therefrom, using said indication data and default flash picture parameters data stored at decoder side, a flash effect picture for said flash picture.

4. An apparatus for decoding data for a flash picture that had occurred in a video sequence, wherein the encoded flash picture data belong to a data stream representing the encoded video sequence, and wherein said data for said flash picture are encoded by:
   determining whether or not a current picture is a flash picture;
   if not true, said current picture is encoded in a normal way, wherein the normal way is a standard video decoding;
   if true, either:
   flash picture indication data and flash picture parameters data are generated for insertion into said data stream, and said flash picture is not encoded and not inserted into said data stream, said apparatus comprising a memory device and a processor device configured to:
   parse the received data stream for getting said flash picture indication data and said flash picture parameters data;
   temporally interpolate from at least one normal-way decoded pictures adjacent to said flash picture a non-flash picture and for generating therefrom, using said indication data and flash picture parameters data, a flash effect picture for said flash picture; or
   flash picture indication data are generated for insertion into said data stream, and said flash picture is not encoded and not inserted into said data stream, said apparatus comprising a memory device and a processor device configured to:

parse the received data stream for getting said flash picture indication data;

temporally interpolate from at least one standard decoded pictures adjacent to said flash picture a non-flash picture and for generating therefrom, using said indication data and default flash picture parameters data stored at decoder side, a flash effect picture for said flash picture.

\* \* \* \* \*